(12) United States Patent
Siripunkaw et al.

(10) Patent No.: US 8,149,847 B2
(45) Date of Patent: Apr. 3, 2012

(54) INITIALIZING, PROVISIONING, AND MANAGING DEVICES

(75) Inventors: Pak Siripunkaw, Sicklerville, NJ (US); John Jason Brzozowski, Schwenksville, PA (US); Srinivas Avirneni, Mount Laurel, NJ (US); Emery J. Weber, Denver, CO (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 423 days.

(21) Appl. No.: 11/603,396

(22) Filed: Nov. 22, 2006

(65) Prior Publication Data

US 2007/0180484 A1    Aug. 2, 2007

Related U.S. Application Data

(60) Provisional application No. 60/739,472, filed on Nov. 23, 2005, provisional application No. 60/791,803, filed on Apr. 13, 2006.

(51) Int. Cl.
*H04L 12/28* (2006.01)
*H04L 12/56* (2006.01)

(52) U.S. Cl. ............ 370/395.5; 370/401; 709/222; 725/111

(58) Field of Classification Search ............ 370/346, 370/352, 485, 395.2, 235, 392, 395.3, 389; 725/111, 78

See application file for complete search history.

(56) References Cited

U.S. PATENT DOCUMENTS

| | | | |
|---|---|---|---|
| 5,440,632 A | 8/1995 | Bacon et al. | |
| 5,666,293 A | 9/1997 | Metz et al. | |
| 5,845,077 A | 12/1998 | Fawcett | |
| 6,023,464 A | 2/2000 | Woundy | |
| 6,308,289 B1 | 10/2001 | Ahrens et al. | |
| 6,393,585 B1 | 5/2002 | Houha et al. | |
| 6,501,750 B1 | 12/2002 | Shaffer et al. | |
| 6,529,910 B1 | 3/2003 | Fleskes | |
| 6,553,568 B1 | 4/2003 | Fijolek et al. | |
| 6,560,203 B1 | 5/2003 | Beser et al. | |
| 6,570,855 B1 | 5/2003 | Kung et al. | |
| 6,574,796 B1 | 6/2003 | Roeck et al. | |
| 6,577,642 B1 * | 6/2003 | Fijolek et al. | 370/465 |
| 6,636,485 B1 | 10/2003 | Fijolek et al. | |
| 6,654,387 B1 * | 11/2003 | Beser et al. | 370/485 |
| 6,690,655 B1 | 2/2004 | Miner et al. | |
| 6,693,878 B1 * | 2/2004 | Daruwalla et al. | 370/235 |
| 6,715,075 B1 | 3/2004 | Loukianov | |
| 6,768,722 B1 | 7/2004 | Katseff et al. | |
| 6,831,921 B2 | 12/2004 | Higgins | |

(Continued)

OTHER PUBLICATIONS

ISR issued in PCT/US08/081422, mail date Dec. 23, 2008.

(Continued)

*Primary Examiner* — Hassan Kizou
*Assistant Examiner* — Emmanuel Maglo
(74) *Attorney, Agent, or Firm* — Banner & Witcoff, Ltd.

(57) ABSTRACT

A method of initializing, provisioning, and managing a cable modem and a customer premise equipment device includes sending a customized configuration file to the cable modem. The configuration file contains service provisioning information and further includes information indicative of a network address type for the customer premise equipment device. A message is passed from the cable modem to the customer premise equipment device indicative of the network address type. The customer premise equipment device is provided with a network address in accordance with the network address type indicated in the message. In this way, the customer premise equipment device knows what kind of address to obtain, and excessive transactions are avoided.

20 Claims, 2 Drawing Sheets

U.S. PATENT DOCUMENTS

| | | |
|---|---|---|
| 6,917,675 B2 | 7/2005 | Lazarus et al. |
| 6,952,428 B1 | 10/2005 | Necka et al. |
| 7,035,270 B2 | 4/2006 | Moore, Jr. et al. |
| 7,039,432 B2 | 5/2006 | Strater et al. |
| 7,058,055 B2 | 6/2006 | Mugica et al. |
| 7,085,814 B1 | 8/2006 | Gandhi et al. |
| 7,120,139 B1 | 10/2006 | Kung et al. |
| 7,127,049 B2 | 10/2006 | Godse et al. |
| 7,272,846 B2 | 9/2007 | Williams et al. |
| 7,285,090 B2 | 10/2007 | Stivoric et al. |
| 7,293,078 B2 | 11/2007 | Danforth |
| 7,293,282 B2 | 11/2007 | Danforth |
| 7,308,700 B1 | 12/2007 | Fung et al. |
| 7,334,258 B1 | 2/2008 | Ford et al. |
| 7,337,217 B2 | 2/2008 | Wang |
| 7,372,809 B2* | 5/2008 | Chen et al. .................... 370/229 |
| 7,415,603 B2 | 8/2008 | Woundy et al. |
| 7,443,883 B2 | 10/2008 | Seiden |
| 7,496,485 B2 | 2/2009 | Elfadel et al. |
| 7,496,652 B2 | 2/2009 | Pezzutti |
| 7,502,841 B2* | 3/2009 | Small et al. .................... 709/223 |
| 7,512,969 B2 | 3/2009 | Gould et al. |
| 7,539,193 B2 | 5/2009 | Pfeffer et al. |
| 7,600,003 B1 | 10/2009 | Okmianski et al. |
| 7,617,517 B2 | 11/2009 | Kay et al. |
| 7,647,617 B2 | 1/2010 | Bartfeld et al. |
| 7,693,171 B2 | 4/2010 | Gould |
| 7,836,092 B2 | 11/2010 | Alaniz et al. |
| 7,839,870 B2 | 11/2010 | Siripunkaw et al. |
| 7,848,234 B2 | 12/2010 | McKinnon, III et al. |
| 7,881,225 B2 | 2/2011 | Siripunkaw et al. |
| 8,050,194 B2 | 11/2011 | Siripunkaw et al. |
| 2001/0038690 A1 | 11/2001 | Palmer et al. |
| 2002/0010865 A1 | 1/2002 | Fulton et al. |
| 2002/0013948 A1 | 1/2002 | Aguayo, Jr. et al. |
| 2002/0061012 A1 | 5/2002 | Thi et al. |
| 2002/0106017 A1 | 8/2002 | Dombkowski et al. |
| 2002/0116721 A1 | 8/2002 | Dobes et al. |
| 2002/0152384 A1* | 10/2002 | Shelest et al. ................. 713/176 |
| 2003/0014764 A1* | 1/2003 | Saladino et al. .............. 725/111 |
| 2003/0069965 A1 | 4/2003 | Ma et al. |
| 2003/0106067 A1* | 6/2003 | Hoskins et al. ................ 725/119 |
| 2003/0200548 A1 | 10/2003 | Baran et al. |
| 2004/0024912 A1 | 2/2004 | Fukao et al. |
| 2004/0177133 A1 | 9/2004 | Harrison et al. |
| 2004/0179539 A1* | 9/2004 | Takeda et al. ................. 370/401 |
| 2004/0190699 A1 | 9/2004 | Doherty et al. |
| 2004/0213278 A1 | 10/2004 | Pullen et al. |
| 2005/0034115 A1 | 2/2005 | Carter et al. |
| 2005/0047442 A1* | 3/2005 | Volpe et al. ................... 370/480 |
| 2005/0055595 A1 | 3/2005 | Frazer et al. |
| 2005/0060749 A1* | 3/2005 | Hong et al. ...................... 725/78 |
| 2005/0078668 A1 | 4/2005 | Wittenberg et al. |
| 2005/0078688 A1 | 4/2005 | Sharma et al. |
| 2005/0122976 A1 | 6/2005 | Poli et al. |
| 2005/0123001 A1* | 6/2005 | Craven et al. ................. 370/486 |
| 2005/0204168 A1 | 9/2005 | Johnston et al. |
| 2005/0246757 A1 | 11/2005 | Relan et al. |
| 2006/0031921 A1 | 2/2006 | Danforth et al. |
| 2006/0159100 A1* | 7/2006 | Droms et al. ............... 370/395.2 |
| 2006/0173977 A1 | 8/2006 | Ho et al. |
| 2006/0256799 A1 | 11/2006 | Eng |
| 2006/0271772 A1 | 11/2006 | Woundy et al. |
| 2006/0271946 A1 | 11/2006 | Woundy et al. |
| 2006/0285544 A1 | 12/2006 | Taylor et al. |
| 2007/0016762 A1 | 1/2007 | Ho |
| 2007/0130471 A1 | 6/2007 | Walker Pina et al. |
| 2007/0133409 A1 | 6/2007 | McKinnon, II et al. |
| 2007/0174471 A1 | 7/2007 | Van Rossum |
| 2007/0177526 A1 | 8/2007 | Siripunkaw et al. |
| 2007/0180484 A1 | 8/2007 | Siripunkaw et al. |
| 2007/0183405 A1* | 8/2007 | Bennett ........................ 370/352 |
| 2009/0125958 A1 | 5/2009 | Siripunkaw et al. |
| 2009/0238349 A1 | 9/2009 | Pezzutti |
| 2011/0026536 A1 | 2/2011 | Siripunkaw et al. |

OTHER PUBLICATIONS

EP Search Report 08 84 6111, dated Feb. 7, 2011.
ISR issued in PCT/US06/45184, mail date Oct. 29, 2007.
International Preliminary Report on Patentability issued in PCT/US06/45184, mail date May 27, 2008.

* cited by examiner

INITIALIZING, PROVISIONING, AND MANAGING DEVICES

CROSS-REFERENCE TO RELATED APPLICATIONS

This application claims the benefit of U.S. provisional application Ser. No. 60/739,472, filed on Nov. 23, 2005, which is hereby incorporated by reference. This application claims the benefit of U.S. provisional application Ser. No. 60/791,803, filed on Apr. 13, 2006, which is hereby incorporated by reference.

BACKGROUND OF THE INVENTION

1. Field of the Invention

The invention relates to a method of initializing, provisioning, and managing a cable modem and a customer premise equipment device. The invention further relates to a subscriber gateway device for connecting to a provider network.

2. Background Art

The modern hybrid fiber coax (HFC) network in its typical implementation includes fiber from the head end to the local network fiber node, and includes coax cable for the final signal distribution through a neighborhood. Modern two-way HFC infrastructures are capable of sending gigabytes of data per second to small pockets of homes in a narrowcast way.

Product and service offerings over broadband networks, including cable networks, have expanded in recent years. The cable networks are now used for additional products and services, for example, many cable networks now offer high speed data service in addition to video programming. In the modern HFC network, head end infrastructure may include a cable modem termination system (CMTS) for providing data over cable services in addition to video quadrature amplitude modulation (QAM) infrastructure for providing video content. The video QAMs may connect to various content sources, while the CMTS connects subscribers to the provider network. The provider network may include a variety of infrastructure for providing various services. For example, the provider network may include Domain Name System (DNS) servers, dynamic host configuration protocol (DHCP) servers, voice over Internet protocol (VoIP) gateways and soft switches for connecting to phone networks, among other systems for providing services to subscribers. Further, advances in network technology allow some functionality to be provided from locations upstream or downstream of the traditional head end.

At a subscriber location, a cable modem and a customer premise equipment device such as a set-top box communicate with the head end over the HFC network. In certain applications, it is desirable for both the cable modem and the set-top box to each have a network address. Traditionally, the cable modem utilizes known initializing and provisioning techniques to obtain a network address and establish a connection to the provider network. For example, the data-over-cable service interface specifications (DOCSIS) specify various protocols for managing the connection of a cable modem to a CMTS. In a traditional application where the provider network is an Internet protocol (IP) network utilizing IPv4 addressing, the cable modem can obtain an IP address in a known manner, and customer premise equipment connected to the HFC network through the cable modem may obtain an IP address, for example, by utilizing DHCP.

Although the traditional IPv4 networks have been used for many applications that have been successful, this addressing approach has certain limitations, for example, the number of addresses available. There is a desire to utilize a more advanced addressing technique such as, for example, IPv6.

DOCSIS 3.0 does provide a way to initialize, provision, and manage a cable modem connected to an IPv4 or an IPv6 provider network. During initialization, the CMTS initializes the cable modem such that the cable modem obtains an appropriate IP address. However, in this approach, a customer premise equipment device such as a set-top box connected to the cable modem that needs to dynamically obtain an address is not made aware of the address type of the provider network. In order for the set-top box to obtain a network address, the set-top box could sequentially make requests for different types of addresses until eventually an address of the correct type is requested and obtained. For example, a set-top box could request an IPv4 address, and if there is no response, request an IPv6 address. Unfortunately, in a large network, these transactions create significant excessive and unwanted network traffic.

For the foregoing reasons, there is a need for a method of initializing, provisioning, and managing a cable modem and a customer premise equipment device in which the customer premise equipment device is informed as to the proper network address type of the network so as to avoid unnecessary transactions which become very significant in a large network implementation.

SUMMARY OF THE INVENTION

In accordance with the invention, a method of initializing, provisioning, and managing a cable modem and a customer premise equipment device is provided. The customer premise equipment device is connected to the cable modem. The cable modem is connected to a cable modem termination system (CMTS). The CMTS is connected to a provider network.

The method includes initializing the cable modem connection to the CMTS, providing the cable modem with a network address, and the cable modem receiving a cable modem configuration file from a network server. The configuration file contains service provisioning information. The cable modem passes certain contents of the configuration file to the CMTS, and the CMTS passes certain identifiers back to the cable modem. These initial steps for initializing and provisioning the cable modem may take place in any suitable way.

In accordance with the invention, the method further comprises passing a message from the cable modem to the customer premise equipment device indicative of the network address type. According to the invention, the configuration file, in addition to containing service provisioning information, further includes information indicative of a network address type for the customer premise equipment device. This further information may be included in a number of custom fields in the configuration file. Adding these custom fields to the configuration file as contemplated by the invention allows the configuration file to indicate the network address type for the customer premise equipment device. The customer premise equipment device receives the message passed from the cable modem, and is provided with a network address in accordance with the network address type indicated in the message.

According to the invention, the customer premise equipment device, in turn, does not create excessive network transactions in attempting to obtain its network address. This is achieved by including custom information in the configuration file sent to the cable modem from the network server. This configuration file typically includes various service provisioning information, and in accordance with the invention, additionally includes network address type information for the customer premise equipment device.

At the more detailed level, the invention comprehends additional features. In one aspect, the customer premise equipment device is a network addressable set-top box. The method further comprises requesting a network address for the set-top box in accordance with the network address type indicated in the message. The set-top box and the cable modem may be both embedded in a subscriber gateway.

The provider network connected to the CMTS may be an Internet protocol (IP) network. In this way, the network address type indicated in the configuration file is a type of IP address. For example, the network address type may be indicated as either IPv4 or IPv6. In this way, the embedded set-top box in the subscriber gateway (or other CPE device) knows whether to attempt to obtain an IPv4 address or an IPv6 address, avoiding unnecessary network transactions in order to obtain a network address.

In one aspect of the invention, the provider network includes a dynamic host configuration protocol (DHCP) server. The customer premise equipment device requests a network address in accordance with the network address type indicated in the message by sending a request to the DHCP server.

In preferred embodiments of the invention, the cable modem has a hardware address, for example, a media access control (MAC) address. The network address type for the CPE device indicated by information in the configuration file sent from the network server is based at least in part on the hardware address of the cable modem. That is, configuration files may be customized on a per-modem basis. For example, some set-top boxes may be using IPv4 while others are using IPv6. The provider is able to select a network address type for each customer premise equipment device. This allows a granular approach to implementing the network addressing scheme, and avoids the need to use a single type of addressing for the entire network.

DETAILED DESCRIPTION OF THE PREFERRED EMBODIMENT

Figure 1:
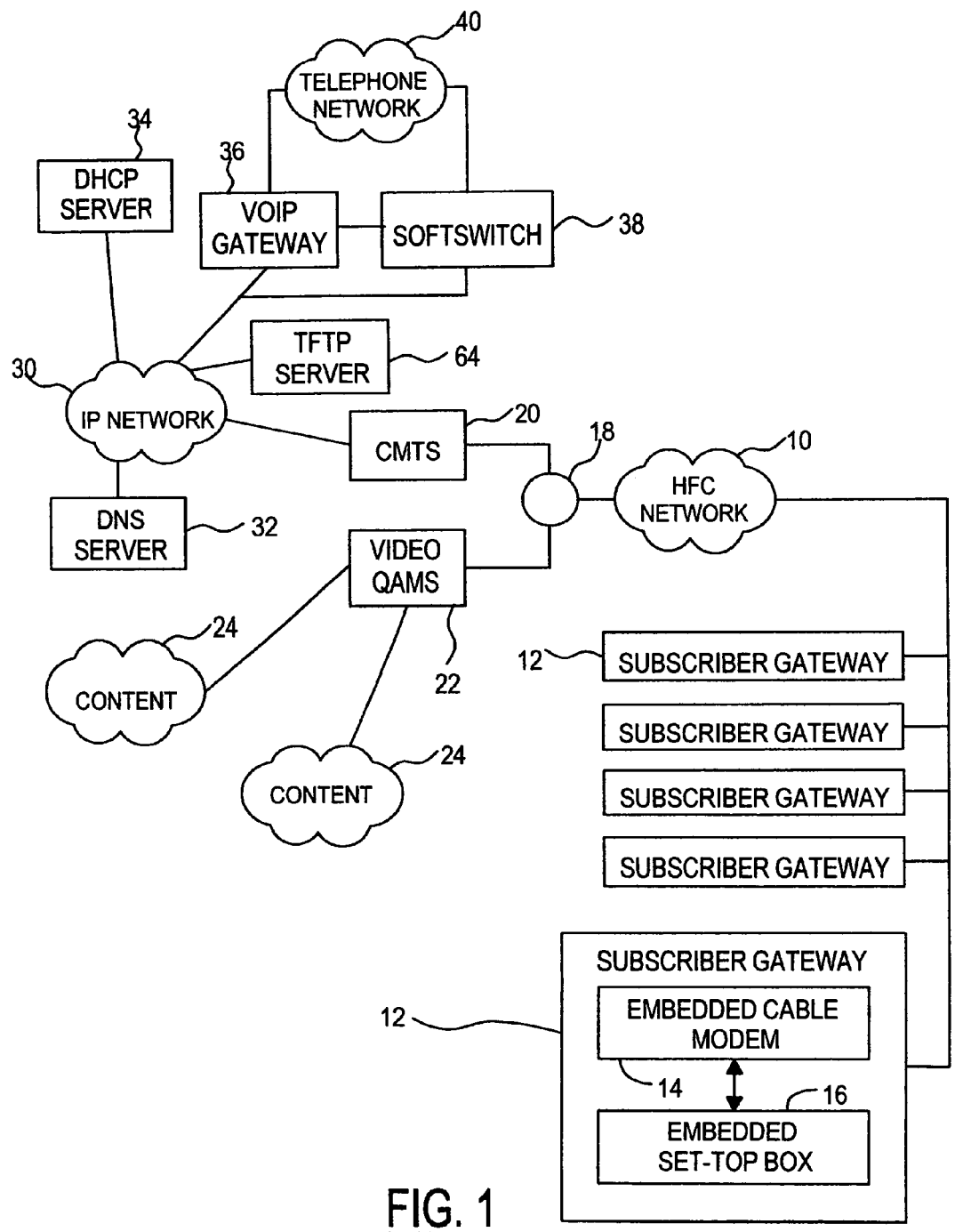
FIG. 1 illustrates a network diagram in accordance with a preferred embodiment of the invention.

In FIG. 1, the hybrid fiber coax (HFC) network 10 provides service to a plurality of subscribers. Each subscriber has a subscriber gateway 12. The subscriber gateway 12 is in the form of a next-generation set-top box and includes an embedded cable modem 14 and an embedded set-top box 16. The head end equipment includes cable modem termination system (CMTS) 20 and a plurality of video quadrature amplitude modulation (QAM) systems 22. Connector 18 illustrates the distribution of content from video QAMs 22 and data over cable from CMTS 20 over HFC network 10. In general, the HFC forward path spectrum includes a plurality of channels. Video QAMs 22 provide programming on the channels. Some channels are reserved for data over cable connections provided by CMTS 20. Video QAMs 22 receive content from any number of sources such as content sources 24.

It is appreciated that the architecture for the head end may vary. Further illustrated in FIG. 1, CMTS 20 connects to the provider IP network 30. Various services are provided to the subscribers; IP network 30 includes the appropriate infrastructure for the needed services. As shown, the network may include Domain Name System (DNS) server 32, dynamic host configuration protocol (DHCP) server 34, and voice over Internet protocol (VoIP) gateway 36 and soft switch 38 for connecting to a telephone network 40. The various servers may be located at the head end, or may be located at other locations connected to the provider network 30. Also, illustrated is trivial file transfer protocol (TFTP) server 64 which serves the configuration files.

Figure 2:
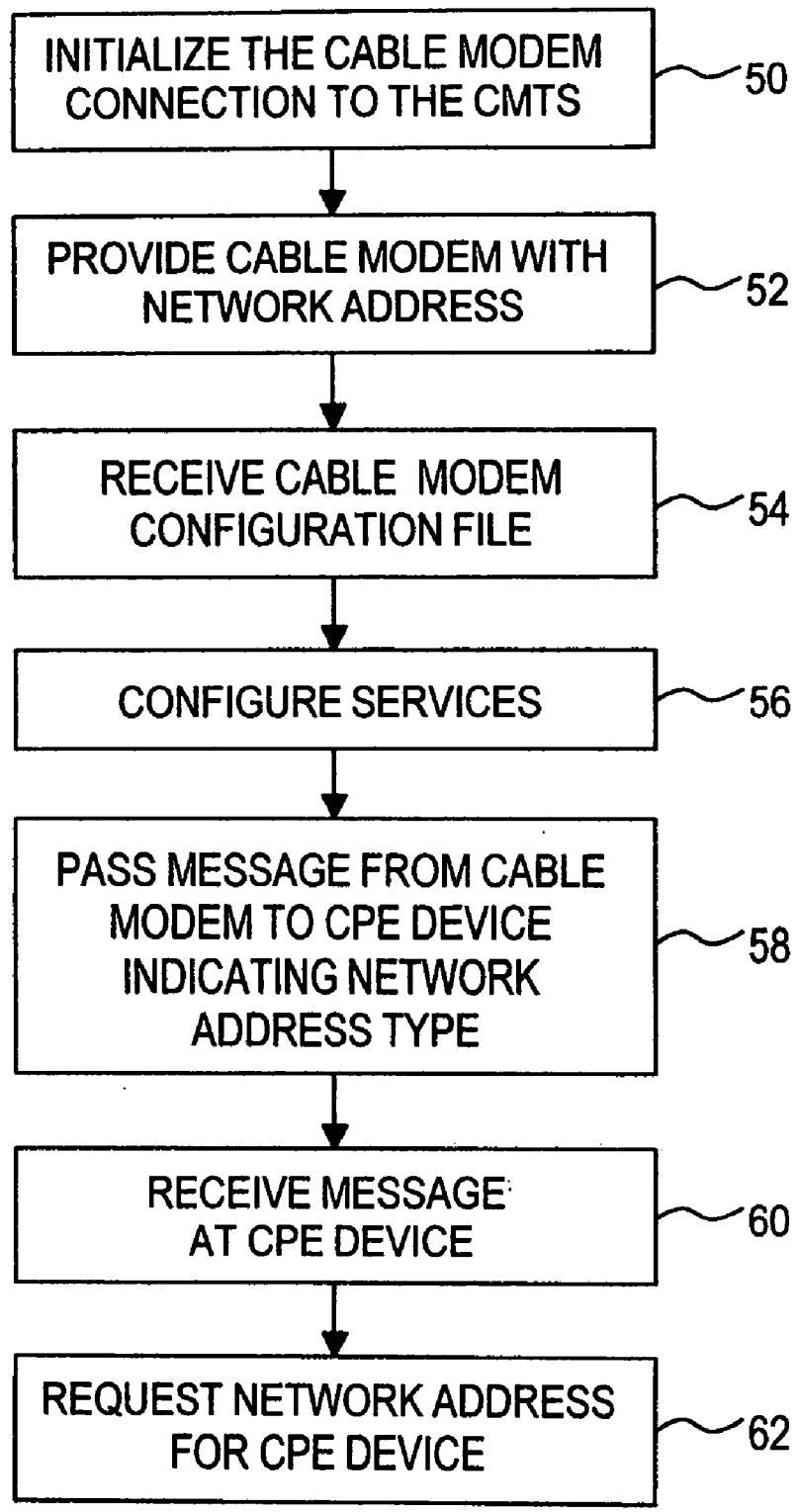
FIG. 2 illustrates initializing, provisioning, and managing a cable modem and a customer premise equipment device in the preferred embodiment of the invention.

With reference to FIGS. 1 and 2, a preferred embodiment of initializing, provisioning, and managing a cable modem and a customer premise equipment device is illustrated. The customer premise equipment device is depicted as an embedded set-top box 16, but may take other forms.

At block 50, the cable modem connection to the CMTS 20 is initialized. At block 52, the cable modem 14 is provided with a network address. In more detail, the cable modem is initialized and provisioned using a suitable technique such as known DOCSIS techniques. At block 54, the cable modem 14 receives the cable modem configuration file, for example, from trivial file transfer protocol (TFTP) server 64. At block 56, services are configured. At this point, the cable modem 16 has completed initialization, and is a manageable network element in the operator's IP network.

Generally, the initializing and provisioning may take place according to DOCSIS standards or any other suitable approach involving a downloaded configuration file; however, in accordance with the invention, the configuration file sent to the cable modem includes service provisioning information and further includes information indicative of a network address type for the embedded set-top box 16 (or other CPE device). The inclusion of this network address type information in the configuration file is a customization to the configuration file in accordance with the invention that has many advantages. This customization may take place by, for example, adding custom fields to the configuration file. According to the invention, cable modem 14 passes a message to the set-top box 16 indicating the network address type. The message passing is indicated at block 58 in FIG. 2. The message passing may take any appropriate form. For example, a direct, dedicated connection between embedded cable modem 14 and embedded set-top box 16 may be used for the message passing. Depending on the application, other approaches may be appropriate, for example, when the CPE device is something other than an embedded set-top box.

At block 60, the message is received, and at block 62, the network address is requested in accordance with the network address type indicated in the message.

It is appreciated that the invention, by customizing the configuration file, provides a way for the embedded set-top box or other CPE device behind the cable modem to make an appropriate request for a network address from the provider network 30. By informing the embedded set-top box 16 of the appropriate network address type, excessive and unnecessary transactions may be avoided. The significance of avoiding these unnecessary transactions increases in a larger network. For example, IP network 30 may be an IPv4, IPv6, or mixed IPv4 and IPv6 network. Suitable techniques for initializing and provisioning the cable modem are used to give the cable modem an appropriate network address. However, in order for the set-top box or other CPE device to be aware of the type of address to request, the cable modem must pass a message to the CPE device as described above.

In a preferred embodiment of the invention, the provider network may take a granular approach to migrating CPE devices between network address types. For example, the network may simultaneously support IPv4 and IPv6 addressing. In this example, for each cable modem/CPE device pair, the network address type for the CPE device is related to the hardware address of the cable modem by the provider. Accordingly, the configuration file sent to a particular cable modem indicates the appropriate network address type for the CPE device paired with the particular cable modem.

It is appreciated that embodiments of the invention may involve any suitable underlying initializing and provisioning technique with a customized configuration file. Further, the cable modem and CMTS may take a variety of forms and the type of cable plant is not limited to coax cable or HFC arrangements.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
    initializing a connection, by a modem, with a modem termination system;
    receiving, by the modem, a configuration file from a network server, wherein the configuration file contains service provisioning information and information indicative of a network address type for a customer premise equipment device; and
    sending a message from the modem to the customer premise equipment device indicative of the network address type informing the customer premise equipment device which one of a plurality of protocol versions to use when requesting a network address.

2. The method of claim 1 wherein the network address type indicated in the configuration file is a type of Internet Protocol address, the method further comprising:
    determining an IP address type from the network address type.

3. The method of claim 1 wherein the modem has a hardware address, and wherein the network address type indicated by information in the configuration file is based at least in part on the hardware address of the modem.

4. The method of claim 2 wherein the determining comprises: including an instruction in the message instructing the customer premise equipment device to use either an IPv4 address type or an IPv6 address type when requesting the network address.

5. The method of claim 3 further comprising:
    establishing a plurality of network address types;
    for a plurality of modem/customer premise equipment device pairs, selecting a network address type for each customer premise equipment device; and
    relating the network address type for each customer premise equipment device to the hardware address of the modem in the respective pair.

6. A method comprising:
    initializing, by a modem, a connection to a modem termination system;
    receiving, by the modem, a configuration file from a network server, wherein the configuration file contains service provisioning information and information indicative of a network address type for a gateway device; and
    sending a message from the modem to the gateway device indicative of the network address type informing the gateway device which one of a plurality of protocol versions to use when requesting a network address.

7. The method of claim 6 further comprising:
    determining an IP address type from the network address type.

8. The method of claim 6 wherein the modem has a hardware address, and wherein the network address type indicated by information in the modem configuration file is based at least in part on the hardware address of the modem.

9. The method of claim 6, wherein the gateway device and the modem are both embedded in an end user gateway.

10. The method of claim 7 wherein the determining comprises:
    obtaining the IP address type from the network address type in the configuration file.

11. The method of claim 8 further comprising:
    establishing a plurality of network address types;
    for a plurality of end user gateways, selecting a network address type for each embedded gateway device; and
    relating the network address type for each embedded gateway device to the hardware address of the modem in the respective end user gateway.

12. The method of claim 10 wherein the obtaining comprises:
    including an instruction in the message instructing the gateway to use either an IPv4 address type or an IPv6 address type when requesting the network address.

13. An end user gateway device comprising:
    a gateway device configured to:
        communicate with a modem;
        receive a message from the modem indicative of a network address type informing which one of a plurality of protocol versions for the gateway device to use when requesting a network address; and
        in response to the message, request a network address in accordance with the network address type indicated in the message.

14. The end user gateway device of claim 13, wherein the gateway device is configured to determine an IP address type from the network address type and configured to request the network address based on the IP address type.

15. The end user gateway device of claim 14, wherein the gateway device is configured to select the IP address type from an IPv4 address type and an IPv6 address type.

16. A method comprising:
    processing, by a first device, a configuration file that contains address information that is indicative of a network address type for a second device; and
    generating and sending, from the first device to the second device, a message indicative of the network address type informing the second device which one of a plurality of protocol versions to use when requesting a network address.

17. A method comprising:
    processing, by a first device, a message received from a second device, the message being indicative of a network address type specified in a configuration file and informing the first device which one of a plurality of protocol versions to use when requesting a network address; and
    in response to the message, requesting a network address by the first device in accordance with the network address type indicated in the message.

18. The method of claim 17, wherein the network address type is based at least in part on a hardware address of the second device.

19. The method of claim 17, wherein the network address type is a type of Internet Protocol address.

20. The method of claim 19, wherein the message instructs the first device to use either an IPv4 address type or an IPv6 address type when requesting the network address.

* * * * *